United States Patent
Zhou

(10) Patent No.: US 9,392,102 B2
(45) Date of Patent: Jul. 12, 2016

(54) APPARATUS AND METHOD FOR PROVIDING PANORAMIC VIEW DURING VIDEO TELEPHONY AND VIDEO MESSAGING

(75) Inventor: Zhinan Zhou, Sammamish, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 924 days.

(21) Appl. No.: 13/215,742

(22) Filed: Aug. 23, 2011

(65) Prior Publication Data

US 2013/0050394 A1    Feb. 28, 2013

(51) Int. Cl.
    *H04N 7/14*        (2006.01)
    *H04M 1/725*       (2006.01)
    *H04N 5/232*       (2006.01)
    *H04N 5/247*       (2006.01)

(52) U.S. Cl.
     CPC ....... *H04M 1/72555* (2013.01); *H04N 5/23238* (2013.01); *H04N 5/247* (2013.01); *H04M 2250/52* (2013.01); *H04N 2007/145* (2013.01)

(58) Field of Classification Search
     USPC ........... 348/14.01, 2, 8, 14.02, 14.08, 211.12, 348/239, 432.1, 575, 14.1; 379/93.21, 158, 379/202.01, 205.01
     See application file for complete search history.

(56) References Cited

U.S. PATENT DOCUMENTS

| | | | |
|---|---|---|---|
| 2004/0174434 A1* | 9/2004 | Walker | G06F 17/30265 348/211.3 |
| 2006/0269264 A1* | 11/2006 | Stafford et al. | 396/56 |
| 2011/0216154 A1* | 9/2011 | Nam | 348/14.07 |
| 2011/0283223 A1* | 11/2011 | Vaittinen et al. | 715/781 |
| 2012/0050458 A1* | 3/2012 | Mauchly et al. | 348/14.16 |
| 2012/0092435 A1* | 4/2012 | Wohlert | H04N 7/147 348/14.02 |
| 2012/0092436 A1* | 4/2012 | Pahud | G06Q 10/10 348/14.02 |

* cited by examiner

*Primary Examiner* — Yosef K Laekemariam
(74) *Attorney, Agent, or Firm* — Jefferson IP Law, LLP

(57) ABSTRACT

An apparatus and method for performing video telephony by a mobile terminal are provided. The method includes establishing a video telephony connection with another mobile terminal, capturing a first image with a first camera, capturing a second image with a second camera, transmitting image information of at least one of the first image and the second image to a server, determining if image data is received from the server, if the image data is received, creating a panoramic image with the image data and at least one of the first image and the second image, and transmitting the panoramic image to the other mobile terminal.

20 Claims, 7 Drawing Sheets

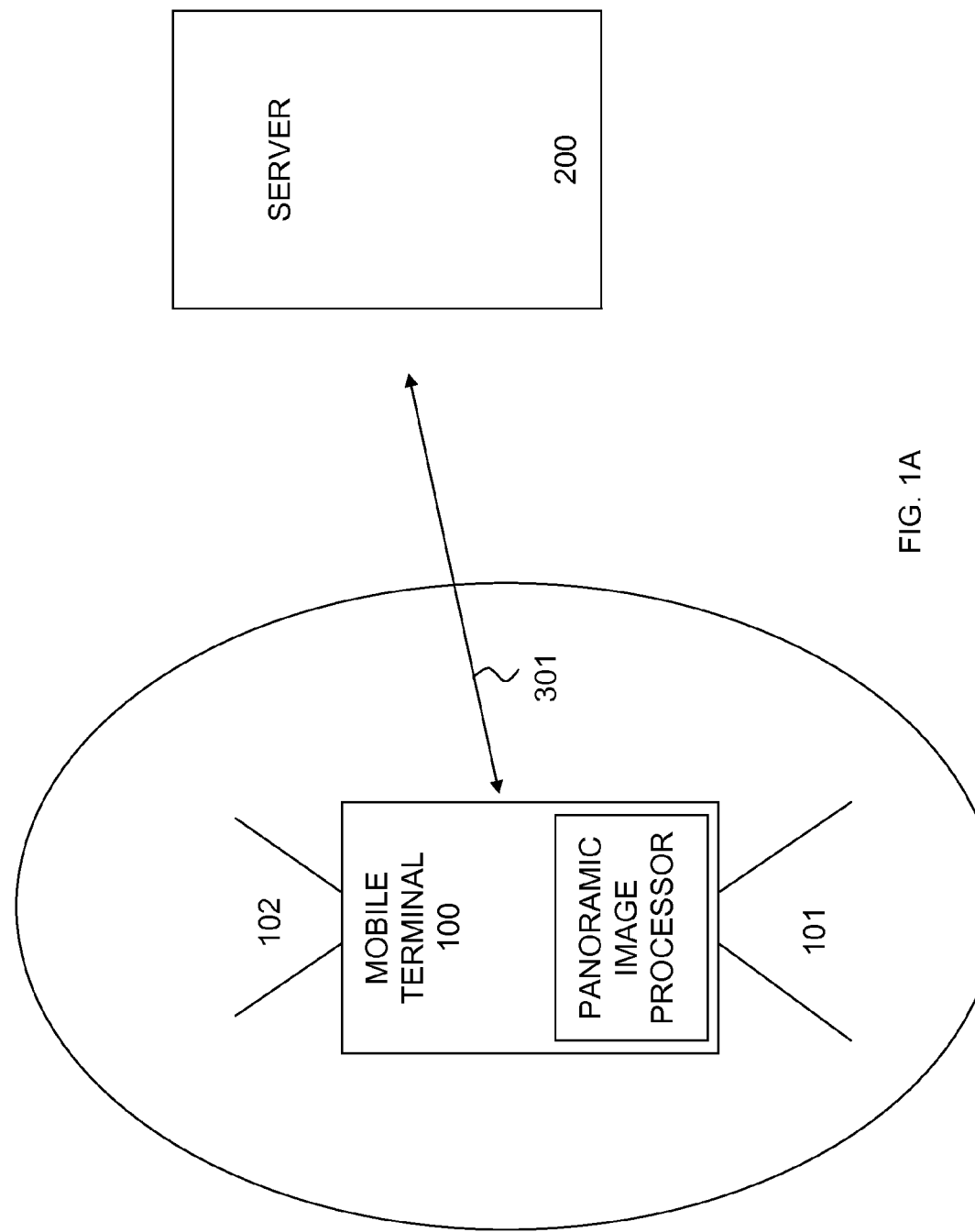

APPARATUS AND METHOD FOR PROVIDING PANORAMIC VIEW DURING VIDEO TELEPHONY AND VIDEO MESSAGING

BACKGROUND OF THE INVENTION

1. Field of the Invention

The present invention relates to an apparatus and method for performing video telephony and video messaging. More particularly, the present invention relates to an apparatus and method for providing a panoramic view during video telephony and video messaging.

2. Description of the Related Art

Mobile terminals were developed to provide wireless communication between users. As technology has advanced, mobile terminals now provide many additional features beyond simple telephone conversation. For example, mobile terminals are now able to provide additional functions such as an alarm, a Short Messaging Service (SMS), a Multimedia Message Service (MMS), electronic-mail (e-mail), games, an image capturing function using a mounted digital camera, a multimedia function for providing audio and video content, a scheduling function, and many more. With the plurality of features now provided, a mobile terminal has effectively become a necessity of daily life.

One such additional function now provided on many mobile terminals is a video calling and/or messaging function. As it is currently supported, the video calling/messaging function captures an image of the user of the mobile terminal and provides the image to another user during the video calling/messaging function. However, the image transmitted by the mobile terminal is obtained using only a single camera which is mounted to one side of the mobile terminal. Furthermore, even if the mobile terminal has two or more cameras, for example a camera mounted on a front side of the mobile terminal and a camera mounted on a back side of the mobile terminal, the video calling/messaging function still only provides an image from one of the cameras. At most, the obtained image can be switched between an image obtained by the front camera and an image obtained by the back camera.

During operation of the video calling/messaging function, the user may want to show the surrounding environment in addition to the image of the user. However, there is currently no technology to support this function for a mobile device. Accordingly, there is a need for an apparatus and method for providing a panoramic image while performing a video calling/messaging function.

SUMMARY OF THE INVENTION

Aspects of the present invention are to address at least the above-mentioned problems and/or disadvantages and to provide at least the advantages described below. Accordingly, an aspect of the present invention is to provide an apparatus and method for providing a panoramic image while performing a video calling/messaging function.

Another aspect of the present invention is to provide an apparatus and method of a mobile terminal having a plurality of cameras for capturing and combining images to provide a panoramic image during a video calling/messaging function.

Still another aspect of the present invention is to provide an apparatus and method of a mobile terminal that captures a plurality of images using a respective plurality of cameras, that transmits the plurality of images to a server, that receives image information from the server, and that composes a panoramic image using the plurality of images and the image information from the server.

Yet another aspect of the present invention is to provide an apparatus and method of a mobile terminal that captures and provides a plurality of images to a server, that determines and provides metadata, such as location information, to the server, that receives image information from the server based on the metadata, and that composes a panoramic image using the plurality of images and the image information from the server.

Yet another aspect of the present invention is to provide a server that receives image information from a mobile terminal, that determines if image data corresponding to the image information is available, that produces a panoramic image, and that transmits the panoramic image to the mobile terminal.

In accordance with an aspect of the present invention, a method for performing video telephony by a mobile terminal is provided. The method includes establishing a video telephony connection with another mobile terminal, capturing a first image with a first camera, capturing a second image with a second camera, transmitting image information of at least one of the first image and the second image to a server, determining if image data is received from the server, if the image data is received, creating a panoramic image with the image data and at least one of the first image and the second image, and transmitting the panoramic image to the other mobile terminal.

In accordance with another aspect of the present invention, a mobile terminal for performing video telephony is provided. The mobile terminal includes a first camera for capturing a first image, a second camera for capturing a second image, a control unit for determining if image data is received from a server and for, if the image data is received, creating a panoramic image with the image data and at least one of the first image and the second image, and a communication unit for establishing a video telephony connection with another mobile terminal, for transmitting image information of at least one of the first image and the second image to the server, and for transmitting the panoramic image to the other mobile terminal.

In accordance with still another aspect of the present invention, a method for supporting video telephony by a server is provided. The method includes receiving image information from a mobile terminal, determining a location of the mobile terminal, creating a panoramic image using the image information received from the terminal, and transmitting the panoramic image to the mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1A illustrates a system for implementing a panoramic video calling/messaging function according to a first exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 1B:
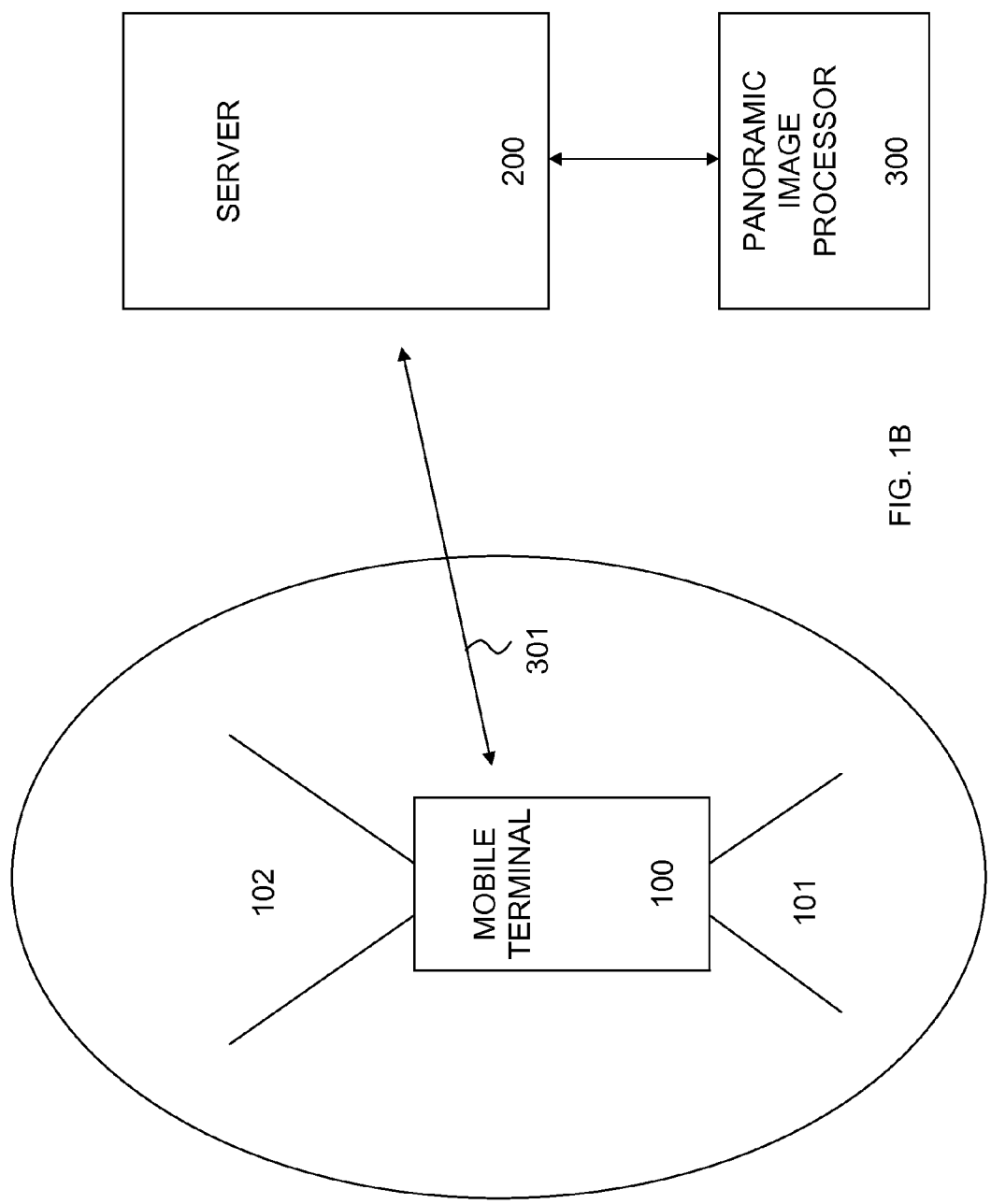
FIG. 1B illustrates a system for implementing a panoramic video calling/messaging function according to a second exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The following exemplary embodiments of the present invention are described as applied to a "mobile terminal." However, it is to be understood that this is merely a generic term and that the invention is equally applicable to any of a mobile phone, a palm sized Personal Computer (PC), a Personal Communication System (PCS), a Personal Digital Assistant (PDA), a Hand-held PC (HPC), a smart phone, an International Mobile Telecommunication 2000 (IMT-2000) terminal, a wireless Local Area Network (LAN) terminal, a laptop computer, a netbook, and the like. Accordingly, use of the term "mobile terminal" should not be used to limit application of the present inventive concepts to any certain type of apparatus or device.

Exemplary embodiments of the present invention include an apparatus and method for creating a panoramic view for use in a video calling/messaging function of a mobile terminal. The apparatus and method include the mobile terminal for capturing a plurality of images for use in creating the panoramic image and for performing the video calling/messaging function with another terminal. Also provided is a server that includes an image database in which image data is stored. By communicating with the server, the mobile terminal is able to receive image data and provide an augmented panoramic image using the received image data. Based on the following description, it will become apparent that there are several exemplary embodiments by which to implement the present invention. In a first exemplary embodiment, a mobile terminal is provided with a panoramic image processor so that a panoramic image is produced by the mobile terminal. In a second exemplary embodiment, a panoramic image processor is located remotely from the mobile terminal so that a panoramic image, produced remotely from the mobile terminal, is provided to the mobile terminal for use during execution of a video calling/messaging function. Also, in implementation of the second exemplary embodiment, the panoramic image processor may be included as a component in a remote server that is contacted by the portable terminal, or may be a separate component that provides the panoramic image to the server, which in turn provides the panoramic image to the mobile terminal.

FIG. 1A illustrates a system for implementing a panoramic video calling/messaging function according to a first exemplary embodiment of the present invention.

Referring to FIG. 1A, the system includes a mobile terminal 100 and a server 200. The mobile terminal 100, which will be described in more detail below with reference to FIG. 2, includes at least a first camera, a second camera, and a panoramic image processor.

In an exemplary implementation, the first camera is located on a first side of the mobile terminal 100. With that orientation, the first camera is able to obtain a first image 101 of the user of the mobile terminal 100 during execution of a video calling/messaging function. Also in an exemplary implementation, the second camera is located on a side of the mobile terminal 100 that is opposite to the side on which the first camera is located. For example, if the first camera is located on the front side of the mobile terminal 100, the second camera is located on a back side of the mobile terminal 100. With the opposing orientation, the second camera is able to obtain a second image 102 of scenery surrounding the mobile terminal 100. Of course, while two cameras are described, it is to be understood that this is for ease of discussion purposes only and not to be considered a limitation on the present invention. Rather, additional cameras will allow for obtaining additional images, which, as will be discussed below, provide for a more accurate panoramic image. As an example, the mobile terminal 100 may be considered as a cuboid having a camera on each face. As another example, the mobile terminal 100 may have one or more rounded surface such that two or more cameras placed on a rounded surface may have different fields of view when simultaneously obtaining images.

A user of the mobile terminal 100 may perform a video calling/messaging function with another party. During execution of the video calling/messaging function, the mobile terminal 100, using the first camera and the second camera, obtains the first image 101 and the second image 102. The first image 101, obtained by the first camera, includes the user of the mobile terminal 100. The first image 101 may also include an environment behind or otherwise surrounding the user, depending on the shooting distance and other settings of the first camera. The second image 102, obtained by the second camera, is of the environment surrounding the mobile terminal. The first image 101 and the second image 102 are used to create a panoramic view that illustrates the environment surrounding the user while the user performs the video calling/messaging function. Further, the panoramic view is transmitted to the other party during the video calling/messaging function.

Figure 3A:
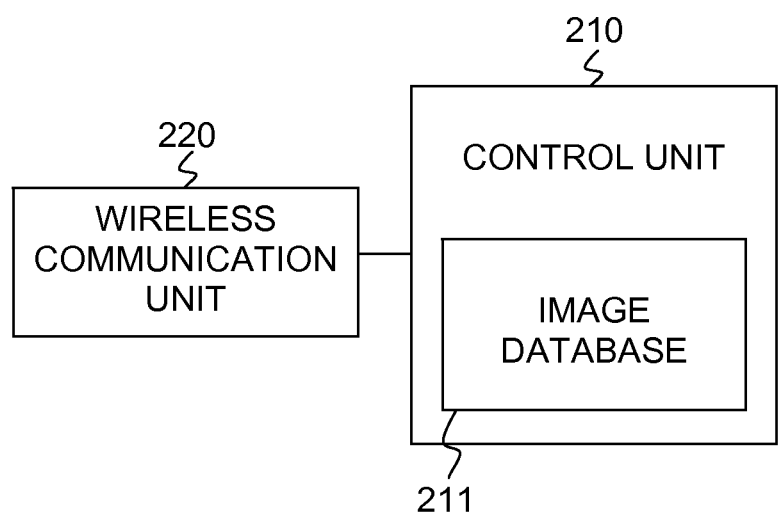
FIG. 3A is a block diagram of a server for providing a panoramic image according to the first exemplary embodiment of the present invention.

As part of the video calling/messaging function, the mobile terminal 100 establishes a communication link 301 with the server 200. The server 200, which may be a local or remote component and is described in more detail below with reference to FIG. 3A, is provided for contribution to the panoramic image created by the mobile terminal 100. The server 200 includes a database of images such as photographs or other images corresponding to different locations.

In an exemplary implementation, during execution of the video calling/messaging function, the mobile terminal 100 transmits the first image 101 and the second image 102 to the server 200 via the communication link 301. The server 200 receives the first image 101 and the second image 102 from the mobile terminal 100 and, using the received images, determines the location of the mobile terminal 100. Based on the location of the mobile terminal 100, the first image 101, and the second image 102, the server 200 determines image data from the image database corresponding to the location of the mobile terminal 100. More specifically, the server 200 determines image data that is missing from the first image 101 and the second image 102; that is, image data that is needed to augment the first image 101 and the second image 102 to provide a more complete panoramic image.

The server 200 accesses the determined image data and provides the image data to the mobile terminal 100 using the communication link 301. Upon receipt of the image data from the server 200, the mobile terminal 100 provides the image data to the panoramic image processor which combines the received image data with the first image 101 and the second image 102 to create a panoramic image for use in the video calling/messaging function. The augmented panoramic image is then provided to the other user during execution of the video calling/messaging.

As described above, the mobile terminal 100 may be provided with additional cameras to capture additional respective images. A benefit of providing additional cameras is that less image data will be needed from the server 200 in order for the panoramic image processor of the mobile terminal 100 to create a panoramic image. Also, the additional images will allow the server 200 to more easily determine the location of the mobile terminal 100. However, during communication with the server 200, the mobile terminal need not transmit all images to the server 200, regardless of how many images are captured. For example, as described above, if the mobile terminal 100 is provided with two cameras and captures a first image 101 and a second image 102, the mobile terminal does not need to transmit the entire first image 101 and the entire second image 102 to the server 200. Rather, the mobile terminal 100 may transmit only partial image information to the server 200 depending on variables such as the speed at which the surrounding environment changes, limitations of the communication link 301, and the like. For example, if the user of the mobile terminal 100 is stationary during a video call, the mobile terminal 100 may transmit only partial information of a second image 102. Alternatively, it may be necessary for the mobile terminal 100 to transmit all image information to the server 200 if the location changes rapidly.

In another exemplary implementation, the mobile terminal 100 not only provides the first image 101 and the second image 102 to the server 200, but also provides metadata to the server 200. Using the received metadata, the server 200 is able to more accurately determine the image data corresponding to the location of the mobile terminal 100. As an example, the metadata may include latitude and longitude information of the mobile terminal 100. As another example, the metadata may include information regarding landmarks nearby the mobile terminal 100. When metadata is provided to the server 200, the server 200 may be able to determine corresponding image data without as much image information from the mobile terminal 100. Thus, it may be more efficient to transmit metadata and less than all of the image information, which typically includes a lower quantity of data than the entirety of the image information.

Again, based on the received image information and any provided metadata, the server 200 determines corresponding image data and provides the corresponding image data to the mobile terminal 100 for use by the panoramic image processor. If there occurs a situation in which the server 200 is unable to determine image data corresponding to the location of the mobile terminal 100, or the server 200 does not have access to image data corresponding to the location of the mobile terminal, the panoramic image processor of the mobile terminal 100 will create a panoramic image using only the images captured by the cameras of the mobile terminal 100.

FIG. 1B illustrates a system for implementing a panoramic video calling/messaging function according to a second exemplary embodiment of the present invention.

Referring to FIG. 1B, the system includes a mobile terminal 100, a server 200, and a panoramic image processor 300. The mobile terminal 100 and the server 200 are substantially the same as described with reference to FIG. 1A and their description will not be repeated here for conciseness. However, it is noted that the mobile terminal 100 of FIG. 1B does not include a panoramic image sensor. Rather, in the exemplary embodiment of FIG. 1B, the panoramic image processor 300 is provided as a component that is separate from the mobile terminal 100.

In the case of FIG. 1B, the mobile terminal 100 again captures images 101 and 102 and provides the captured images to server 200 via communication link 301. As in the exemplary embodiment of FIG. 1A, the server 200 again determines image data from an image database corresponding to the location of the mobile terminal 100. That is, the server 200 determines image data based on the captured images 101 and 102 received from the mobile terminal 100, based on metadata received from the mobile terminal 100, or based on a combination of both the captured images 101 and 102 and the metadata. In this case however, the server 200 provides the image data to the panoramic image processor 300 that is located remotely from the mobile terminal 100, rather than to the mobile terminal 100. The panoramic image processor 300 creates a panoramic image for use by the mobile terminal 100 during a video calling/messaging function and provides the panoramic image to the server 200. The server 200 transmits the panoramic image to the mobile terminal using communication link 301.

According to exemplary implementations of the present invention, the panoramic image processor 300 may be a component of the server 200, may be a stand alone component that is located remotely from both the mobile terminal 100 and the server 200, or may be a component of an apparatus that is located remotely from both the mobile terminal 100 and the server 200.

Figure 2:
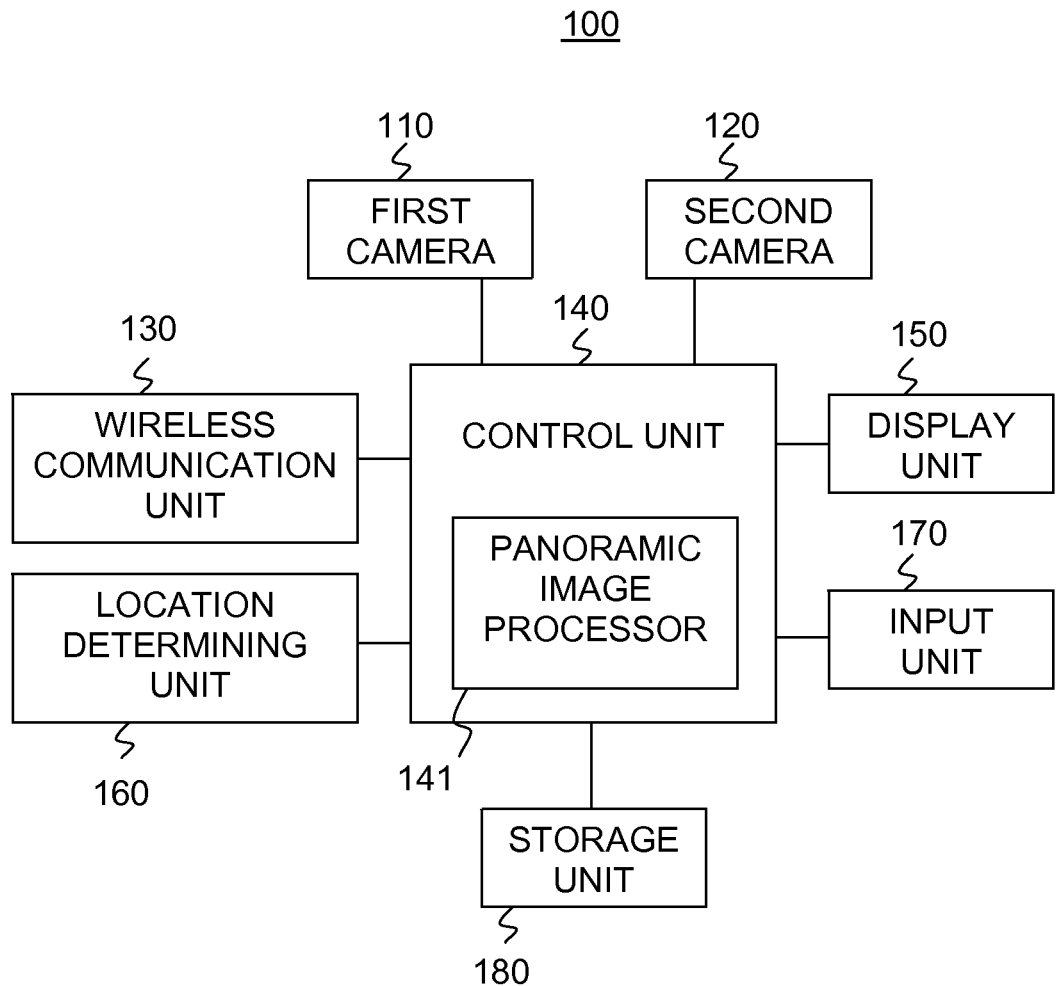
FIG. 2 is a block diagram of a mobile terminal for providing a panoramic image according to an exemplary embodiment of the present invention.

FIG. 2 is a block diagram of a mobile terminal for providing a panoramic image according to an exemplary embodiment of the present invention.

Referring to FIG. 1, the mobile terminal 100 includes a first camera 110, a second camera 120, a wireless communication unit 130, a control unit 140, a display unit 150, a location determining unit 160, an input unit 170, and a storage unit 180.

The first camera 110 and the second camera 120 each includes a camera sensor (not shown) for capturing an image and converting an optical signal corresponding to the captured image into an analog electrical signal. Each of the first camera 110 and the second camera 120 also includes a signal processor (not shown) for converting the analog electrical signal into digital data. Each camera sensor may be a Charge-Coupled Device (CCD) sensor or a Complementary Metal-Oxide-Semiconductor (CMOS) sensor, and the signal processor may be a Digital Signal Processor (DSP). The camera sensor and the signal processor may be realized as separate entities or as a single entity. More particularly, during a video calling/messaging function, the first camera 110 captures a first image, for example an image of the user, and the second camera 120 captures a second image, such as scenery surrounding the mobile terminal 100. Each of first camera 110 and the second camera 120 forwards the respective captured image to the control unit 140.

While only two cameras are illustrated in FIG. 2, it is to be understood that this is merely for ease of description and not to be considered a limitation. Rather, it is to be understood that additional cameras may be provided to obtain additional images for use in creating a panoramic image for transmission during a video calling/messaging function.

The wireless communication unit 130 sends and receives data for wireless communication of the mobile terminal 100. The wireless communication unit 130 may include a Radio Frequency (RF) transmitter for up-converting the frequency of a signal to be transmitted and amplifying the signal, and an RF receiver for low-noise amplifying a received signal and down-converting the frequency of the signal. The wireless communication unit 130 may receive data through a wireless channel and forward the received data to the control unit 140, and may transmit data from the control unit 140 through the wireless channel. More particularly, the wireless communication unit 130 may receive a contact such as a call, a Short Message Service (SMS) message, a Multimedia Message Service (MMS) message or an e-mail from an external mobile terminal and forward the received data to the control unit 140. During execution of a video calling/messaging function by the mobile terminal 100, the wireless communication unit 130 receives images of the caller from an external mobile terminal and transmits images to the caller of the external mobile terminal. More specifically, during execution of the video calling/messaging function, the wireless communication unit 130 transmits an image of the user captured by the first camera 110 as well as a panoramic image created by images captured by the first camera 110 and the second camera 120 and augmented by image data received from a server. Furthermore, the wireless communication unit 130 may receive image data from a server that is located remotely from the mobile terminal 100.

The display unit 150 may be realized using Liquid Crystal Display (LCDs) devices, Organic Light Emitting Diodes (OLEDs), or Active Matrix Organic Light Emitting Diodes (AMOLEDs). The display unit 150 provides the user with various information such as menus, input data, function-setting data, and the like in a visible form. The display unit 150 may output a boot screen, an idle screen, a menu screen, a call handling screen, and other application screens. According to an exemplary embodiment of the present invention, the display unit 150 may also output images received and transmitted during execution of a video calling/messaging function. For example, the display unit 150 may output the image of a user of another mobile terminal with which the mobile terminal 100 is conducting a video call/message. Furthermore, the display unit 150 may output a panoramic image which is to be transmitted to the user of the other mobile terminal. Still further, the display unit 150 may output a panoramic image to be transmitted along with a menu or similar screen with which the user may select to transmit the panoramic image. That is, the user may be provided with an opportunity to review the panoramic image prior to its transmission to the other user.

The location determining unit 160 is provided to determine a location of the mobile terminal 100. In an exemplary implementation, the location determining unit includes a Global Positioning System (GPS) receiver. In that case, the determined location information generally includes the latitude, the longitude, and the height value indicating the position of the mobile terminal 100. Among this information, the latitude and the longitude information should necessarily be determined but, in some cases, the height information may not be determined. In an alternative embodiment, the location information may be acquired by means of a different position information providing service, such as a Location Based Service (LBS), without being limited to the GPS receiver. The location information determined by the location determining unit 160 is provided to the controller 140.

The input unit 170 generates a key signal corresponding to user manipulation for controlling the mobile terminal 100 and sends the key signal to the control unit 140. The input unit 170 may include a keypad having alphanumeric and direction keys arranged in a 3*4 or QWERTY layout, or a touch panel. The input unit 170 may further include a button key, a jog key, a wheel key, and the like. The input unit 170 generates an input signal for executing an application (e.g., related to call handling, music playback, reproduction of still and moving images, photographs, Digital Multimedia Broadcasting (DMB) reception or the like) according to user input, and sends the input signal to the control unit 140. More particularly, when executing a video calling/messaging function, the input unit 170 allows the user to control the capturing of images by the first camera 110 and the second camera 120, allows selection of a panoramic image, allows for control of communication with a server, and the like.

The storage unit 180 stores programs and data used for operation of the mobile terminal 100, and may include a program region and a data region. The program region may store a control program for controlling the overall operation of the mobile terminal 100, an Operating System (OS) for booting the mobile terminal 100, an application program for playing back multimedia content, and application programs necessary for optional functions of the mobile terminal 100 related to photography, sound, and still and moving images. The data region may store data generated in the course of using the mobile terminal 100, such as still images, moving images, phonebooks, audio data, and the like. More particularly, the storage unit 180 may store images captured by the first camera 110 and the second camera 120, metadata including data corresponding to the location of the mobile terminal 100, image data received from a server, and the like. During execution of a video calling/messaging function, the storage unit 180 may be accessed by the control unit 140 to provide the stored metadata to a server.

The control unit 140 controls the overall functions of the mobile terminal 100 and includes a panoramic image processor 141. According to an exemplary embodiment, the panoramic image processor 141 creates a panoramic image for use during a video calling/messaging function performed by the mobile terminal 100. The panoramic image processor 141 receives images captured by the first camera 110 and the second camera 120. Using the received images, the panoramic image processor 141 combines the images to create the panoramic image for use in the video calling/messaging function. Furthermore, the panoramic image processor 141 receives image data provided from a server and uses the image data to augment the panoramic image created based on the images received from the first camera 110 and the second camera 120. The panoramic image processor 141 provides the panoramic image to the wireless communication unit 130 for transmission during execution of a video calling/messaging function. Also, the panoramic image processor 141 may provide the panoramic image to the display unit 150 for viewing by the user of the mobile terminal 100 prior to its transmission.

Of course, as described above with reference to FIG. 1B, the mobile terminal 100 may be provided without the panoramic image processor 141 if a panoramic image processor, which creates and provides a panoramic image for the mobile terminal, is provided remotely.

FIG. 3A is a block diagram of a server for providing image data according to the first exemplary embodiment of the present invention.

Referring to FIG. 3A, the server 200 includes a control unit 210 and a wireless communication unit 220. The control unit 210 also includes an image database 211 that includes image data relating to a plurality of locations. The image data may include photographs or other image information previously provided by the user of the mobile terminal 100 or by a distinct owner/operator of the server 200. The image data contained in the image database 211 may further include identifying information that allows it to be correlated with a location. For example, the image data may include coordinate information such as latitude and longitude regarding the location from which the image data was obtained, or may include information regarding a landmark with which the image data is associated.

The wireless communication unit 220 is provided for receiving information from a mobile terminal and for transmitting information to the mobile terminal. For example, the wireless communication unit 220 may receive complete or partial images from a mobile terminal and provide the received image information to the control unit 210. The control unit 210 may process and evaluate the image information to determine a location associated with the information. Based on the determined location, the control unit 210 may determine if the image database 211 includes image data associated with the location. If the control unit 210 determines that the image database 211 contains corresponding image data, the control unit 210 accesses the corresponding data, and provides the data to the wireless communication unit 220 for transmission. Alternatively, if the image database 211 does not include corresponding image data, the control unit 210 may instruct the wireless communication unit 220 to transmit a message indicating the lack of corresponding data.

The wireless communication unit 220 may also receive metadata from a mobile terminal. The metadata may include coordinate information such as a latitude and longitude of the mobile terminal or may include information regarding a nearby landmark. In either case, the wireless communication unit 220 provides the metadata to the control unit 210, which determines if the image database 211 includes image data associated with the location. For example, if the image data of the image database 211 is cataloged using coordinates associated with the data, the control unit 210 may search the image database 211 using the coordinates. Alternatively, if the image data is cataloged by landmarks, the control unit 210 may search the image database using the landmark information. Once associated image data is obtained by the control unit 210, the image data is provided to the wireless communication unit 220 for transmission to the mobile terminal.

Although the communication unit 220 of FIG. 3A is described as being wireless, in an alternative exemplary embodiment, the communication unit 220 may include a wired component. That is, the communication unit 220 may provide either or both a wired connection and a wireless connection. Notably, the server 200 is typically connected to the Internet such that the communication unit provides a wired connection.

Figure 3B:
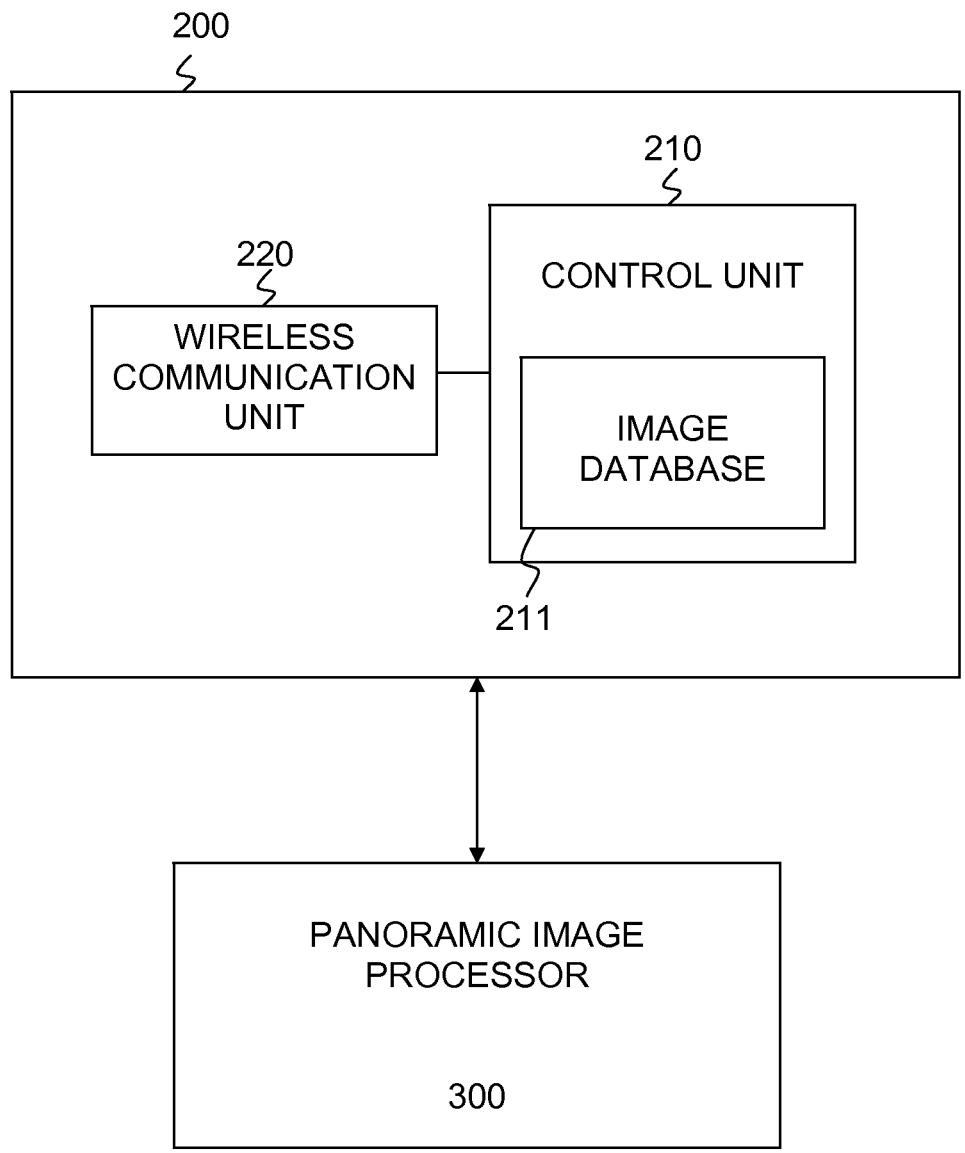
FIG. 3B is a block diagram of a server for providing image data according to the second exemplary embodiment of the present invention.

FIG. 3B is a block diagram of a server for providing image data according to the second exemplary embodiment of the present invention.

Referring to FIG. 3B, the server 200, including a control unit 210, an image database 211, and a wireless communication unit 220, is substantially the same as the server 200 illustrated in FIG. 3A. Thus, a description of these components will not be provided again for sake of conciseness. However, the server 200 of FIG. 3B further includes a panoramic image processor 300.

The panoramic image processor 300 may be provided as a component of the server 200 or as a component that is located remotely from the server 200. If the panoramic image processor 300 is located remotely from the server 200, the panoramic image processor 300 may be a stand-alone component, or a component of another apparatus that is located remotely from the server 200.

The panoramic image processor 300 receives image data from the server 200 depending on its location. That is, if the panoramic image processor 300 is local to server 200, the image data may be provided by internal communication means of the server 200, such as a bus line, or other local communication method. On the other hand, if the panoramic image processor 300 is located remotely from the server 200, the image data may be provided to the panoramic image processor 300 using the wireless communication unit 220 or through a wired network connection, such as a backhaul connection.

Using image data received from the server 200 as well as image information provided by a mobile terminal, the panoramic image processor 300 creates a panoramic image for use in a video calling/messaging function of the mobile terminal. That is, the panoramic image processor 300 receives image data provided from the server 200 and uses the image data to create the panoramic image based on the images received from the cameras of the mobile terminal. The panoramic image processor 300 provides the panoramic image to the server 200 using either an internal or external communication means depending on its location as discussed above.

Figure 4:
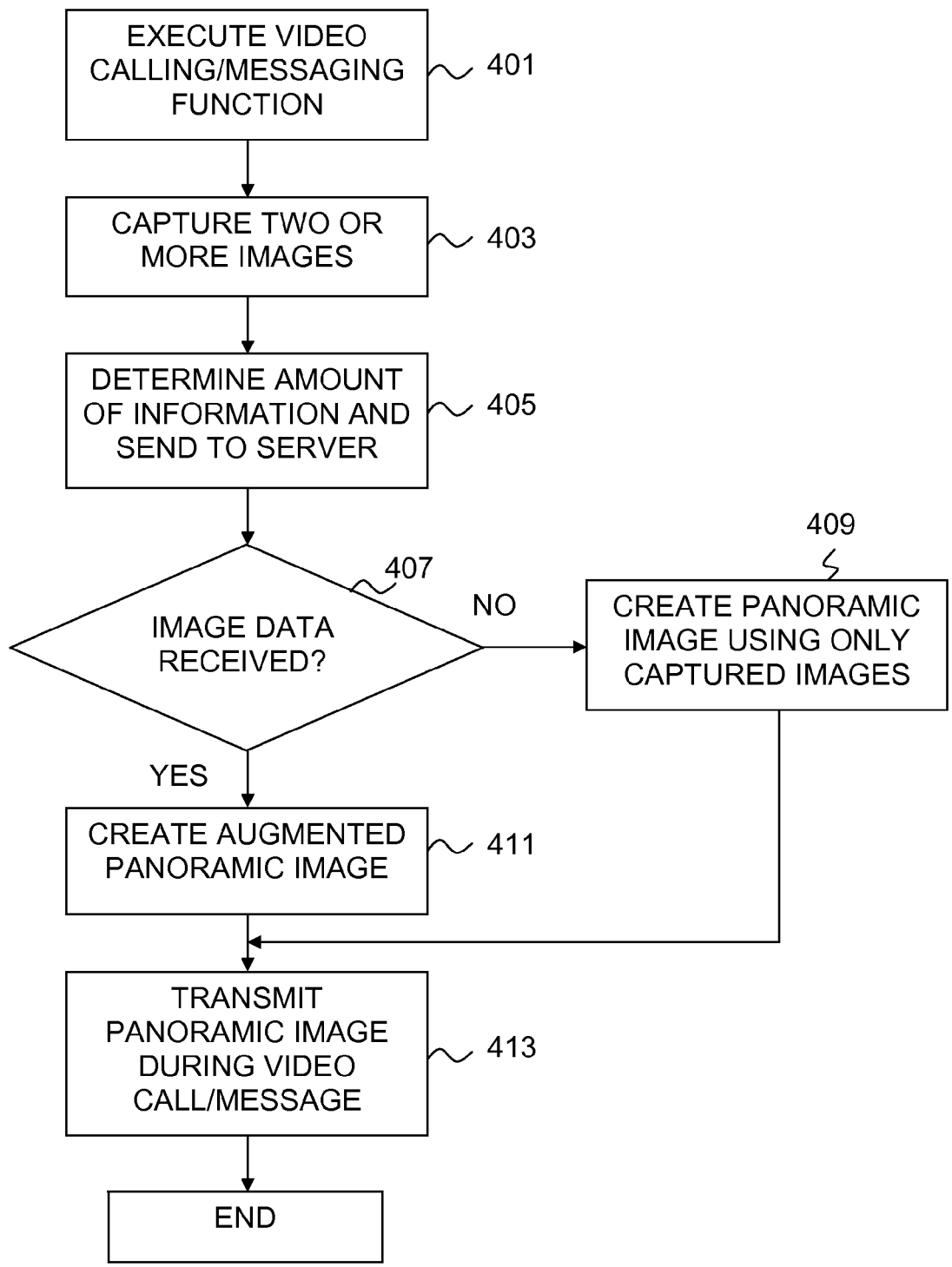
FIG. 4 is a method for executing a video calling/messaging function including a panoramic image by a mobile terminal according to an exemplary embodiment of the present invention.

FIG. 4 is a method for executing a video calling/messaging function including a panoramic image by a mobile terminal according to an exemplary embodiment of the present invention.

Referring to FIG. 4, the mobile terminal executes a video calling/messaging function in step 401. During execution of the video calling/messaging function, the mobile terminal captures two or more images in step 403 using cameras of the mobile terminal. As an example, the mobile terminal may capture a first image including an image of the user of the mobile terminal and a second image including scenery surrounding the mobile terminal. In step 405, the mobile terminal determines an amount of image information to transmit to a server and transmits the information. As an example, the mobile terminal may determine to send all image information to the server if the image information is changing quickly. As an alternative, the mobile terminal may determine to send only partial information if the mobile terminal is substantially stationary such that the surrounding scenery and corresponding image information is not changing quickly.

After transmission of the image information to the server, the mobile terminal determines in step 407 if image data is received from the server. If it is determined in step 407 that the image data is received, the mobile terminal uses the image data received from the server to create an augmented panoramic image in step 411. On the other hand, if it is determined in step 407 that image data is not received, the mobile terminal creates a panoramic image in step 409 using only the two or more images captured in step 403. After either of steps 409 or 411, the mobile terminal transmits the panoramic image during a video call/message in step 413 and then ends the procedure.

Figure 5:
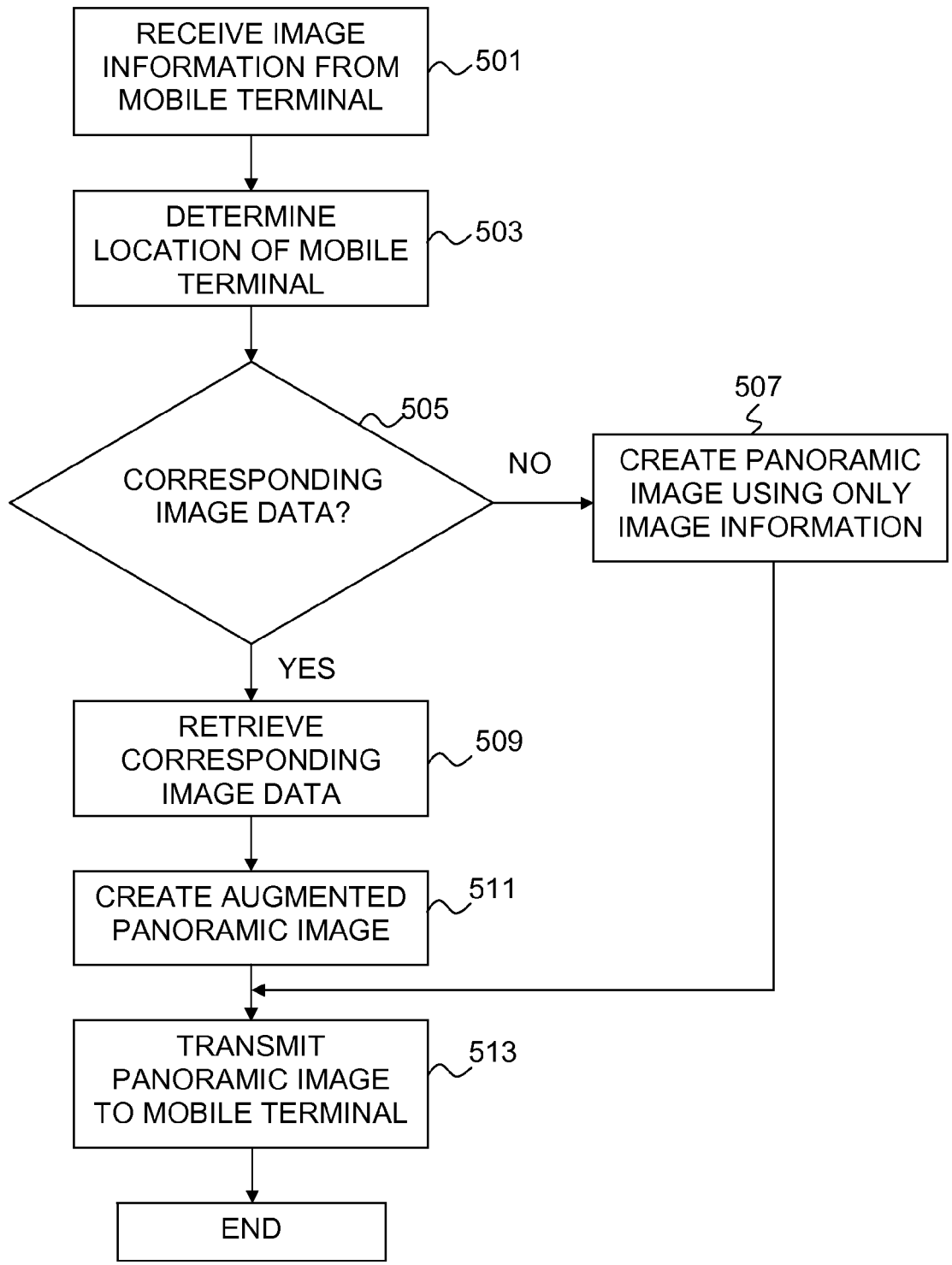
FIG. 5 is a method for supporting a video calling/messaging function by a server having a panoramic image processor according to an exemplary embodiment of the present invention.

FIG. 5 is a method for supporting a video calling/messaging function by a server having a panoramic image processor according to an exemplary embodiment of the present invention.

Referring to FIG. 5, the server receives image information provided by a mobile terminal in step 501. The image information may be received through a wired or wireless communication with the server. In step 503, the server determines a location of the mobile terminal. In an exemplary implementation, the server may determine the location of the mobile terminal based on the image information received from the mobile terminal, based on metadata received from the mobile terminal, or based on both the image information and metadata received. Based on the location of the mobile terminal, the server determines if image data corresponding to the location is available in step 505. For example, the server may determine if a local data base includes image data corresponding to the determined location of the mobile terminal.

If it is determined in step 505 that corresponding image data is not available, the server proceeds to step 507 and creates a panoramic image using only the image information received from the mobile terminal. In an exemplary implementation, the server provides the image information to a panoramic image processor for creation of the panoramic image. As discussed above, the panoramic image processor may be either a component that is local to the server or a component that is located remotely from the server.

If it is determined in step 505 that corresponding image data is available, the server proceeds to step 509 and retrieves image data corresponding to the determined location of the mobile terminal. The server then proceeds to step 511 in which an augmented panoramic image is created. The panoramic image is created in step 511 by a panoramic image processor that is located either locally or remotely. To create the panoramic image, the panoramic image processor augments the image information transmitted by the mobile terminal with the image data retrieved by the server. In step 513, the server transmits the panoramic image created by the panoramic image processor to the mobile terminal for use during a video calling/messaging function and then ends the procedure.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing video telephony by a mobile terminal, the method comprising:
   establishing a video telephony connection with another mobile terminal;
   capturing a first image with a first camera of the mobile terminal, the first image representing an image of a user of the mobile terminal;
   capturing a second image with a second camera of the mobile terminal, the second image representing an image of a surrounding environment of the mobile terminal;
   determining an amount of image information to transmit to a server;
   transmitting image information of at least one of the first image and the second image to the server;
   determining if image data is received from the server;
   when the image data is received from the server, creating, by the mobile terminal, a panoramic image by combining the image data received from the server with at least one of the first image and the second image; and
   transmitting, by the mobile terminal, the panoramic image to the other mobile terminal,
   wherein the determined amount of image information to transmit to the server comprises only partial image information of the first image or the second image if one or more conditions are met.

2. The method of claim 1, further comprising transmitting metadata to the server.

3. The method of claim 2, wherein the metadata comprises at least one of location coordinates and landmark information.

4. The method of claim 1, wherein, if the image data is not received, the panoramic image is created with the first image and the second image.

5. The method of claim 1, wherein the amount of image information determined for transmission to the server corresponds to an amount of movement of the mobile terminal during a time period.

6. The method of claim 5, wherein, if the amount of movement of the mobile terminal during the time period is greater than a threshold, the image information transmitted to the server includes all of the first image and the second image.

7. The method of claim 5, wherein, if the amount of movement of the mobile terminal during the time period is less than a threshold, the image information transmitted to the server includes less than all of the first image and the second image.

8. A mobile terminal for performing video telephony, the mobile terminal comprising:
   a first camera for capturing a first image, the first image representing an image of a user of the mobile terminal;
   a second camera for capturing a second image, the second image representing an image of a surrounding environment of the mobile terminal;
   a control unit configured to:
      determine an amount of image information to transmit to a server,
      determine if image data is received from the server, and
      when the image data is received from the server, create a panoramic image by combining the image data received from the server with at least one of the first image and the second image; and a communication unit configured to:
establish a video telephony connection with another mobile terminal,
transmit image information of at least one of the first image and the second image to the server, and
transmit the panoramic image to the other mobile terminal,
wherein the determined amount of image information to transmit to the server comprises only partial image information of the first image or the second image if one or more conditions are met.

9. The mobile terminal of claim 8, wherein the communication unit transmits metadata to the server.

10. The mobile terminal of claim 9, wherein the metadata comprises at least one of location coordinates and landmark information.

11. The mobile terminal of claim 8, wherein, if the image data is not received, the control unit creates the panoramic image with the first image and the second image.

12. The mobile terminal of claim 8, wherein the amount of image information determined for transmission to the server corresponds to an amount of movement of the mobile terminal during a time period.

13. The mobile terminal of claim 12, wherein, if the amount of movement of the mobile terminal during the time period is greater than a threshold, the image information transmitted to the server includes all of the first image and the second image.

14. The mobile terminal of claim 12, wherein, if the amount of movement of the mobile terminal during the time period is less than a threshold, the image information transmitted to the server includes less than all of the first image and the second image.

15. A method for supporting video telephony by a server, the method comprising:
receiving a determined amount of image information transmitted from a mobile terminal, the image information representing at least one of an image of a user of the mobile terminal and an image of a surrounding environment of the mobile terminal;
determining a location of the mobile terminal;
creating a panoramic image by combining the image information received from the terminal and image data of the server; and
transmitting the panoramic image to the mobile terminal,
wherein the determined amount of image information transmitted from the mobile terminal comprises only partial image information of the first image or the second image if one or more conditions are met.

16. The method of claim 15, wherein the determining of the location of the mobile terminal comprises determining the location using at least one of the image information and metadata received from the mobile terminal.

17. The method of claim 16, further comprising:
determining, based on the location of the mobile terminal, if image data corresponding to the location is available.

18. The method of claim 17, wherein, if the image data corresponding to the location of the mobile terminal is available, the creating of the panoramic image comprises creating the panoramic image using the image data and the image information.

19. The method of claim 1, wherein the determination of the amount of image information to transmit to the server is based on a speed of a communication link between the mobile terminal and the server.

20. The mobile terminal of claim 8, wherein the determination of the amount of image information to transmit to the server is based on a speed of a communication link between the mobile terminal and the server.

* * * * *